United States Patent Office 2,769,820
Patented Nov. 6, 1956

2,769,820

CERTAIN NEW 1,4 - NAPHTHOQUINONEIMINES AND METHODS OF PREPARING THE SAME

Jackson P. English, Stamford, and Richard C. Clapp, Old Greenwich, Conn., assignors to American Cyanamid Company, New York, N. Y., a corporation of Maine No Drawing. Application May 21, 1953,
Serial No. 356,605

14 Claims. (Cl. 260—396)

This invention relates to certain new N-phenyl-2-cyclohexyl-amino-1,4-naphthoqninoneimines, their addition salts with acids and methods of preparing the same.

The new compounds of this invention, when in the form of their free bases, can be represented by the following structural formula:

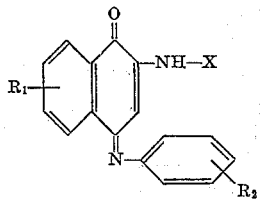

wherein $R_1$ and $R_2$ represent in each instance at least one member selected from the group consisting of hydrogen, lower alkyl, alkyl-amino and dialkylamino groups; and X represents a cyclohexyl nucleus. Since the new compounds of the above formula are amine bases, they form acid addition salts with acids. They can, for example, be isolated in the form of the acid addition salts with hydrochloric acid, nitric acid, citric acid or other acids of this type. Such salts are particularly valuable in isolation and purification procedures and it is intended that they also constitute a part of the present invention.

Whether in the form of their free bases or in the form of their acid addition salts, the new compounds of this invention are valuable dyestuffs. They can be employed to impart color in any number of applications and are, for example, of value in tissue staining. The new compounds of this invention also possess chemotherapeutic activity and can, for instance, be employed against tubercle bacilli infections in mice. By orally administering the new compounds of this invention to mice infected with a deadly strain of tubercle bacilli, the lives of the mice can be prolonged for an appreciable period of time.

As previously stated, the members indicated by $R_1$ and $R_2$ in the above formula can be hydrogen, lower alkyl radicals, alkylamino radicals, or dialkylamino radicals. Lower alkyl radicals which may be suitably represented by $R_1$ and $R_2$ can be illustrated by methyl, ethyl, isopropyl and n-butyl; alkylamino radicals which may suitably be represented by $R_1$ and $R_2$ can be illustrated by ethylamino and isopropylamino; and dialkylamino radicals which may suitably be represented by $R_1$ and $R_2$ can be illustrated by dimethylamino, and di(n-butyl) amino. The cyclohexyl nucleus represented by X in the above formula may be unsubstituted or it can be substituted, for example by substituents of the types suitably represented by $R_1$ and $R_2$.

A particularly convenient method of preparing the compounds described above has been discovered and it is intended that this new method also constitute a part of the present invention. The new method comprises reacting an appropriate cyclohexylamine compound with a 4-anilino-1,2-naphthoquinone as illustrated by the following equation:

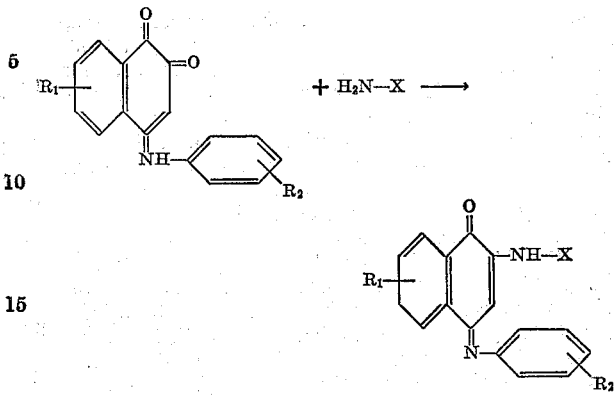

wherein $R_1$, $R_2$ and X are as previously defined.

The reaction is preferably performed in an inert solvent such as illustrated by the aliphatic alcohol solvents, for instance ethanol or butanol; and the cyclic ether solvents, for instance dioxane. It is an advantage that the reaction can be performed within a wide range of temperature, for instance from about 60–130° C. The preferred temperature range is generally from 100–120° C. The reaction is usually complete in from one to twenty-four hours and within the preferred temperature range a reaction time of from two to six hours generally gives excellent results.

The invention will now be more specifically illustrated by the following examples in which all parts are by weight unless otherwise indicated:

EXAMPLE I

*N-p-tolyl-2-cyclohexylamino-1,4-naphthoquinoneimine*

Fifteen parts of 4-p-toluidino-1,2- naphthoquinone, 5½ parts of cyclohexylamine, and 200 parts of n-butanol were mixed and refluxed for three hours. The reaction mixture was cooled and the solid was collected. The solid was dissolved in benzene and chromatographed on alumina, developing with the same solvent. The first colored band which was red on the column was collected and the column was discarded. The benzene containing the first band was evaporated and the residue was crystallized from alcohol to give N-p-tolyl-2-cyclohexyl-amino-1,4-naphthoquinoneimine; M. P. 143.5–145° C.

EXAMPLE II

*N-p-tolyl-2-(4-methylcyclohexylamino)-1,4-naphthoquinoneimine*

Eighteen parts of 4-toluidino-1,2-naphthoquinone and 7.8 parts of 4-methylcyclohexylamine were added to 200 parts of n-butanol and the whole was heated under reflux for three and one-half hours. The mixture was cooled and the solid collected. The solid was crystallized from methanol to give N-p-tolyl-2-(4-methylcyclohexylamino)-1,4-naphthoquinoneimine; M. P. 131–134° C.

EXAMPLE III

*N-p-tolyl-2-(p-diethylaminocyclohexylamino)-1,4-naphthoquinoneimine*

A mixture of 31 parts of 4-p-toluidino-1,2-naphthoquinone, 20 parts of p-diethylaminocyclohexylamine, and 400 parts of n-butanol was refluxed four hours, the butanol removed and the residue dissolved in chloroform. The chloroform solution was extracted with 1 N hydrochloric acid and the acid extract was made basic and extracted with ether. The ether was dried and evaporated to give N-p-tolyl-2-(p-diethylaminocyclohexylamino)-1,4-naphthoquinoneimine as a dark red oil.

EXAMPLE IV

2-cyclohexylamino-N-(p-diethylaminophenyl)-1,4-naphthoquinoneimine

Thirty-two parts of 4-(p-diethylaminoanilino)-1,2-naphthoquinone, 10 parts of cyclohexylamine, and 400 parts of n-butanol were mixed and refluxed for seventeen hours. The reaction mixture was taken to dryness at reduced pressure and the residual gummy solid was treated with cold alcohol, filtering from the undissolved solid. The alcohol was taken to dryness and the residue was dissolved in benzene. The benzene solution was chromatographed on alumina, developing with the same solvent. An initial yellow band was discarded and the succeeding blue band was collected. The solvent containing this band was evaporated to dryness and the residue was digested with methanol and crystallized from ethanol to give 2-cyclohexylamino-N-(p-diethylaminophenyl)-1,4-naphthoquinoneimine; M. P. 104–105° C.

In place of the cyclohexylamine employed above, one can substitute an equivalent quantity of other cyclohexylamine compounds to prepare other new 1,4-naphthoquinoneimines of this invention. For instance, by the substitution of an equivalent quantity of p-diethylaminocyclohexylamine for the cyclohexylamine employed above, N-(p-diethylaminophenyl)-2-(p-diethylaminocyclohexylamino)-1,4-naphthoquinoneimine is prepared, and by the substitution of an equivalent quantity of p-isopropylaminocyclohexylamine, N-(p-diethylaminophenyl) - 2 - (p-isopropylaminocyclohexylamino) - 1,4-naphthoquinoneimine is prepared.

We claim:

1. Compounds selected from the group consisting of 1,4-naphthoquononeimines represented by the formula:

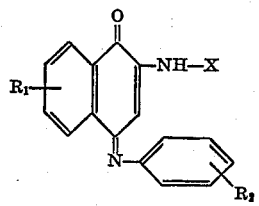

wherein $R_1$ represents hydrogen and $R_2$ represents at least one member selected from the group consisting of lower alkyl radicals, and lower dialkylamino radicals, and X represents a cyclohexyl nucleus; and acid addition salts thereof.

2. The N-[(lower alkyl)phenyl]-2-cyclohexylamino-1,4-naphthoquinoneimines, having the formula:

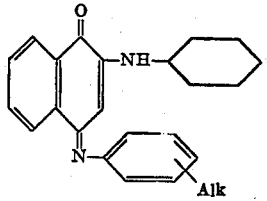

wherein Alk represents a lower alkyl radical.

3. The new compound N-p-tolyl 2-cyclohexylamino-1,4-naphthoquinoneimine, having the formula:

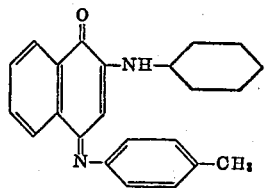

4. The N-[(lower alkyl)phenyl]-2-[(lower alkyl)-cyclohexylamino]-1,4-naphthoquinoneimines, having the formula:

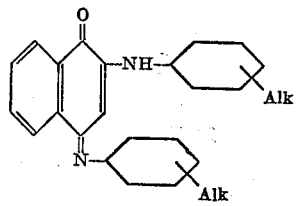

wherein Alk represents a lower alkyl radical.

5. The new compound N-p-tolyl - 2 - (4 - methylcyclohexylamino)-1,4-naphthoquinoneimine having the formula:

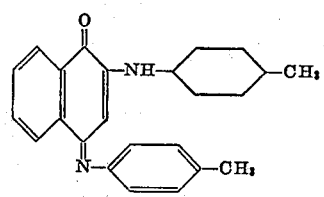

6. The N-[(lower alkyl)phenyl]-2-[lower dialkylamino)-cyclohexylamino] - 1,4 - naphthoquinoneimines having the formula:

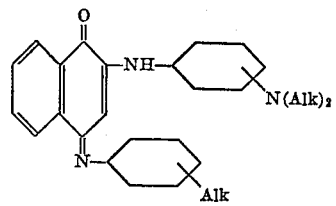

7. The new compound N-p-tolyl-2-(p-diethylaminocyclohexylamino)-1,4-naphthoquinoneimine having the formula:

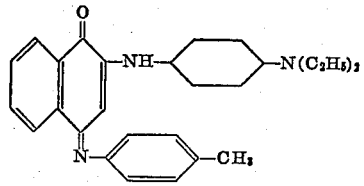

8. The N-[(lower dialkylamino)phenyl]-2-[(lower dialkylamino)cyclohexylamino]-1,4 - napthoquinoneimines having the formula:

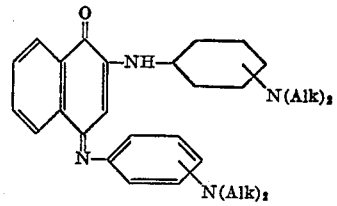

wherein Alk represents a lower alkyl radical.

9. The N-[4-(lower dialkylamino)phenyl]-2-[4-(lower dialkylamino)cyclohexylamino] - 1,4 - naphthoquinoneimines having the formula:

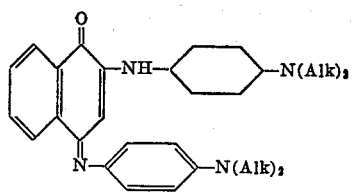

wherein Alk represents a lower alkyl radical.

10. The new compound N-(p-diethylaminophenyl)-2-(p-diethylaminocyclohexylamino) - 1,4 - naphthoquinoneimine having the formula:

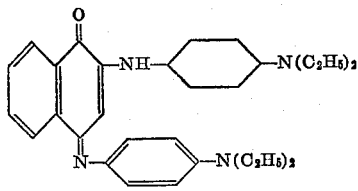

11. The N-[(lower dialkylamino)phenyl]-2-[(lower alkylamino)cyclohexylamino] - 1,4 - naphthoquinoneimines having the formula:

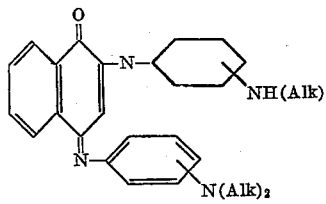

wherein Alk represents a lower alkyl radical.

12. The new compound N-(p-diethylaminophenyl)-2-(p-isopropylaminocyclohexylamino)-1,4-naphthoquinoneimine having the formula:

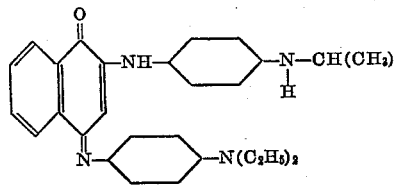

13. A method of preparing compounds selected from the group consisting of 1,4-naphthoquinoneimines represented by the formula:

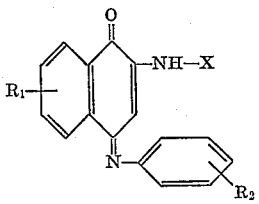

wherein $R_1$ represents hydrogen and $R_2$ represents at least one member selected from the group consisting of hydrogen, lower alkyl radicals, and lower dialkylamino radicals, and X represents a cyclohexyl nucleus; and acid addition salts thereof, which method comprises reacting at a temperature of from 60° C. to 130° C. and in an inert solvent, a cyclohexylamine with a compound of the formula:

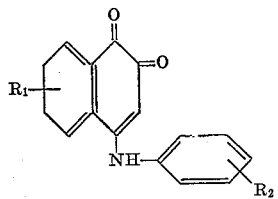

wherein $R_1$ and $R_2$ are as defined above.

14. The method of claim 13 wherein the reaction temperature is from 100° C. to 120° C. and the solvent is a lower aliphatic alcohol.

References Cited in the file of this patent

UNITED STATES PATENTS 2,153,956    Clifford _____ Apr. 11, 1939

FOREIGN PATENTS 206,142    Great Britain _____ 1924